(12) United States Patent
Richards et al.

(10) Patent No.: US 10,955,688 B1
(45) Date of Patent: Mar. 23, 2021

(54) SYSTEMS AND METHODS FOR ASTIGMATISM CORRECTION IN A HEAD-MOUNTED DISPLAY

(71) Applicant: Facebook Technologies, LLC, Menlo Park, CA (US)

(72) Inventors: Evan M. Richards, Fremont, CA (US); Weihua Gao, Foothill Ranch, CA (US); Daozhi Wang, Dublin, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/025,638

(22) Filed: Sep. 18, 2020

Related U.S. Application Data (62) Division of application No. 15/906,295, filed on Feb. 27, 2018, now Pat. No. 10,788,685.

(51) Int. Cl.
*G02C 7/08* (2006.01)
*G02B 3/06* (2006.01)
(Continued)

(52) U.S. Cl.
CPC ............. *G02C 7/083* (2013.01); *G02B 3/06* (2013.01); *G02B 27/0068* (2013.01);
(Continued)

(58) Field of Classification Search
CPC combination set(s) only.
See application file for complete search history.

(56) References Cited

U.S. PATENT DOCUMENTS 8,848,120 B2  9/2014 Jeon et al.
9,599,853 B2  3/2017 Sugita et al.
(Continued)

FOREIGN PATENT DOCUMENTS

EP  3 106 911 A1  12/2016
JP  S62-209412 A   9/1987
(Continued)

OTHER PUBLICATIONS

Rigler, Martin, "Tunable-Focus Liquid Crystal Lens", University of Ljubljana, Faculty of Mathematics and Physics, Oct. 6, 2009, 20 pages.

*Primary Examiner* — Lauren Nguyen
(74) *Attorney, Agent, or Firm* — FisherBroyles, LLP (57) ABSTRACT

The disclosed method may include (1) providing, from a display, an image to an eye by way of a lens assembly on an optical path between the display and the eye, wherein the lens assembly includes (a) a first liquid crystal lens providing a first electronically controllable cylindrical power, oriented along a first constant axis, in response to a first signal and (b) a second liquid crystal lens providing a second electronically controllable cylindrical power, oriented along a second constant axis that is rotationally offset from the first constant axis, in response to a second signal, (2) determining, based on information indicating cylindrical power and cylindrical axis components, the electronically controllable cylindrical powers that result in providing the cylindrical power component, oriented along the cylindrical axis component, and (3) generating, based on the electronically controllable cylindrical powers, the signals. Various other systems and methods are also disclosed.

20 Claims, 7 Drawing Sheets

(51) Int. Cl.
*G02B 27/00* (2006.01)
*G02B 27/01* (2006.01)
*G02C 7/02* (2006.01)
*G06F 1/16* (2006.01)

(52) U.S. Cl.
CPC ......... *G02B 27/0172* (2013.01); *G02C 7/022* (2013.01); *G02B 2027/011* (2013.01); *G02B 2027/0178* (2013.01); *G02C 2202/22* (2013.01); *G02F 2203/28* (2013.01); *G06F 1/163* (2013.01)

(56) References Cited

U.S. PATENT DOCUMENTS

| | | |
|---|---|---|
| 2011/0221656 A1 | 9/2011 | Haddick et al. |
| 2011/0292266 A1 | 12/2011 | Duston et al. |
| 2012/0293861 A1* | 11/2012 | Harder ............... G02B 27/0025 359/356 |
| 2014/0152925 A1 | 6/2014 | Wu |
| 2015/0277151 A1 | 10/2015 | Yadin et al. |
| 2017/0160798 A1 | 6/2017 | Lanman et al. |
| 2017/0219827 A1 | 8/2017 | Pan et al. |

FOREIGN PATENT DOCUMENTS

| | | |
|---|---|---|
| JP | H3-6518 A1 | 1/1991 |
| WO | 2012/054651 A2 | 4/2012 |
| WO | 2019/168876 A1 | 9/2019 |

\* cited by examiner

System 100

SYSTEMS AND METHODS FOR ASTIGMATISM CORRECTION IN A HEAD-MOUNTED DISPLAY

CROSS REFERENCE TO RELATED APPLICATION

This application is a divisional application of U.S. patent application Ser. No. 15/906,295, filed Feb. 27, 2018. The disclosure of this application is incorporated herein, in its entirety, by this reference.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

In at least some current head-mounted displays (HMDs), such as those employed in virtual reality (VR) systems, augmented reality (AR) systems, mixed reality (MR) systems, and the like, a viewer that requires prescription eyeglasses (e.g., a viewer that is not a candidate for optical correction via contact lenses or refractive surgery) may experience some difficulty or discomfort when wearing those eyeglasses while using an HMD (e.g., due to space constraints within the HMD).

Some HMDs may include a varifocal optical system in which a focal distance between two or more components (e.g., between one or more of the viewer's eye, a display device, a viewing lens, and/or the like) may be altered during use to simulate differences in distance between the user and objects portrayed on the display device. Consequently, the same varifocal optical system, in some examples, may also be employed to correct for a spherical component of a viewer's eyeglass prescription, thus possibly allowing the viewer to use such an HMD without eyeglasses.

However, certain viewers may also exhibit some level of astigmatism, which typically results from an asymmetrical (e.g., non-spherical) shape of the cornea or lens of the eye that may cause light rays propagating in different planes to have different foci. Viewers that require eyeglasses for astigmatism correction may thus encounter vision difficulties during use of an HMD, including those HMDs that employ a varifocal optical system.

The present disclosure is generally directed to systems and methods of astigmatic correction for a viewer that may be employed in HMDs, such as those employed in VR systems, AR systems, MR systems, and the like. As will be explained in greater detail below, embodiments of the instant disclosure may facilitate use of an HMD by a viewer without the use of prescription eyeglasses that that user may otherwise require to clearly view images presented by the HMD.

Figure 1:
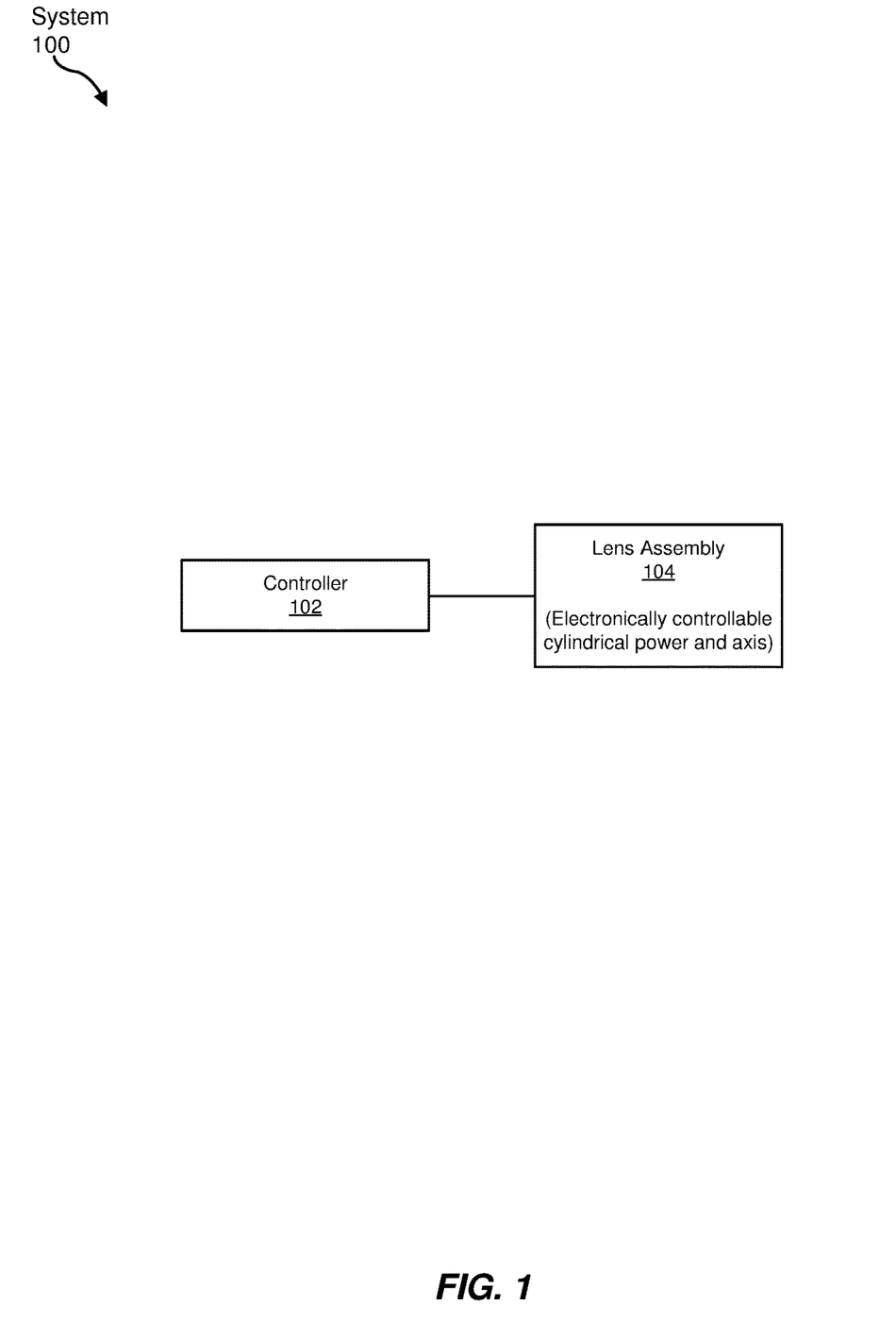
FIG. 1 is a block diagram of an exemplary system for astigmatism correction (e.g., in a head-mounted display (HMD)).
Figure 2:
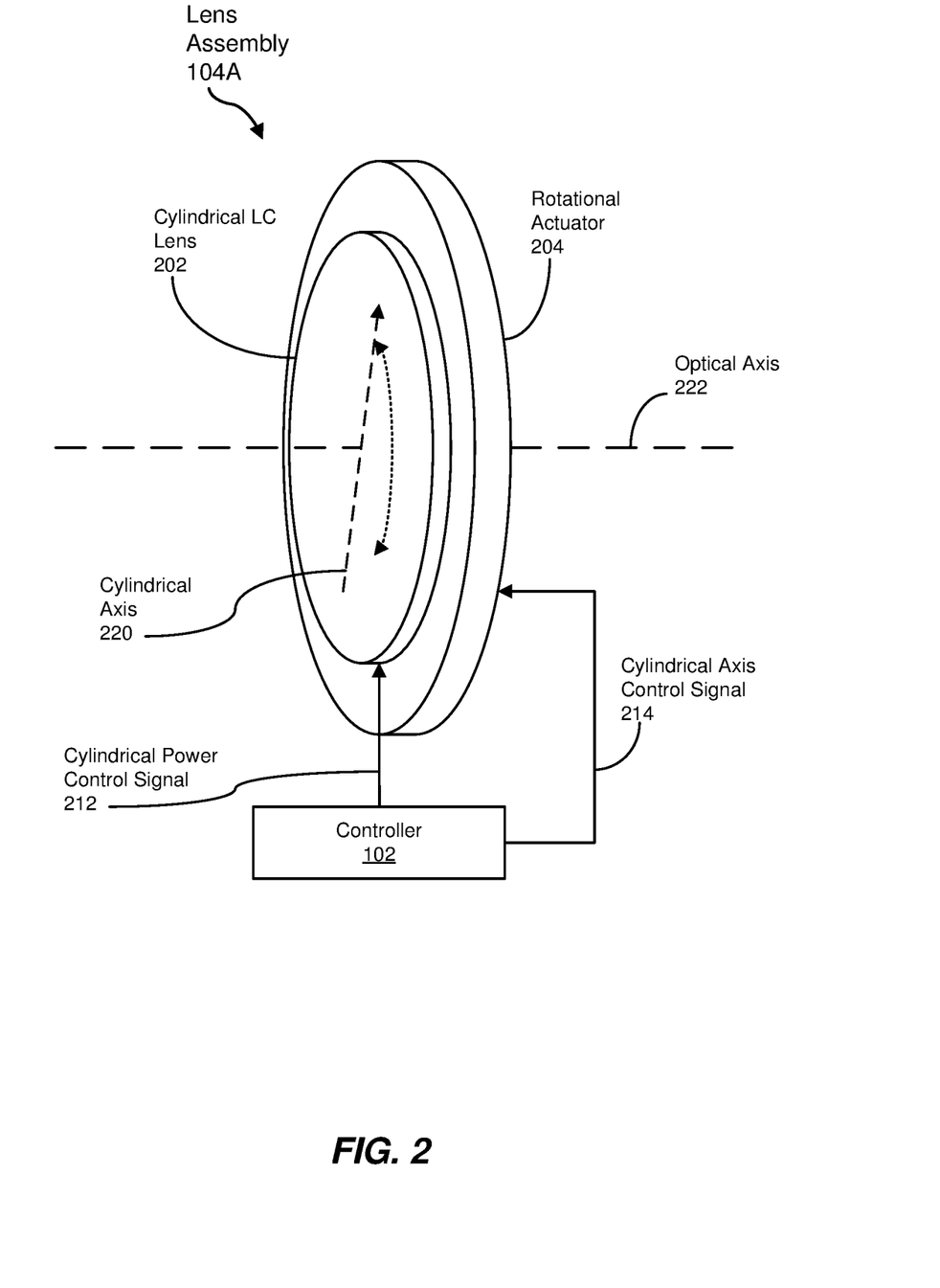
FIG. 2 is a perspective view of an exemplary lens assembly employable in the exemplary system of FIG. 1.
Figure 3:
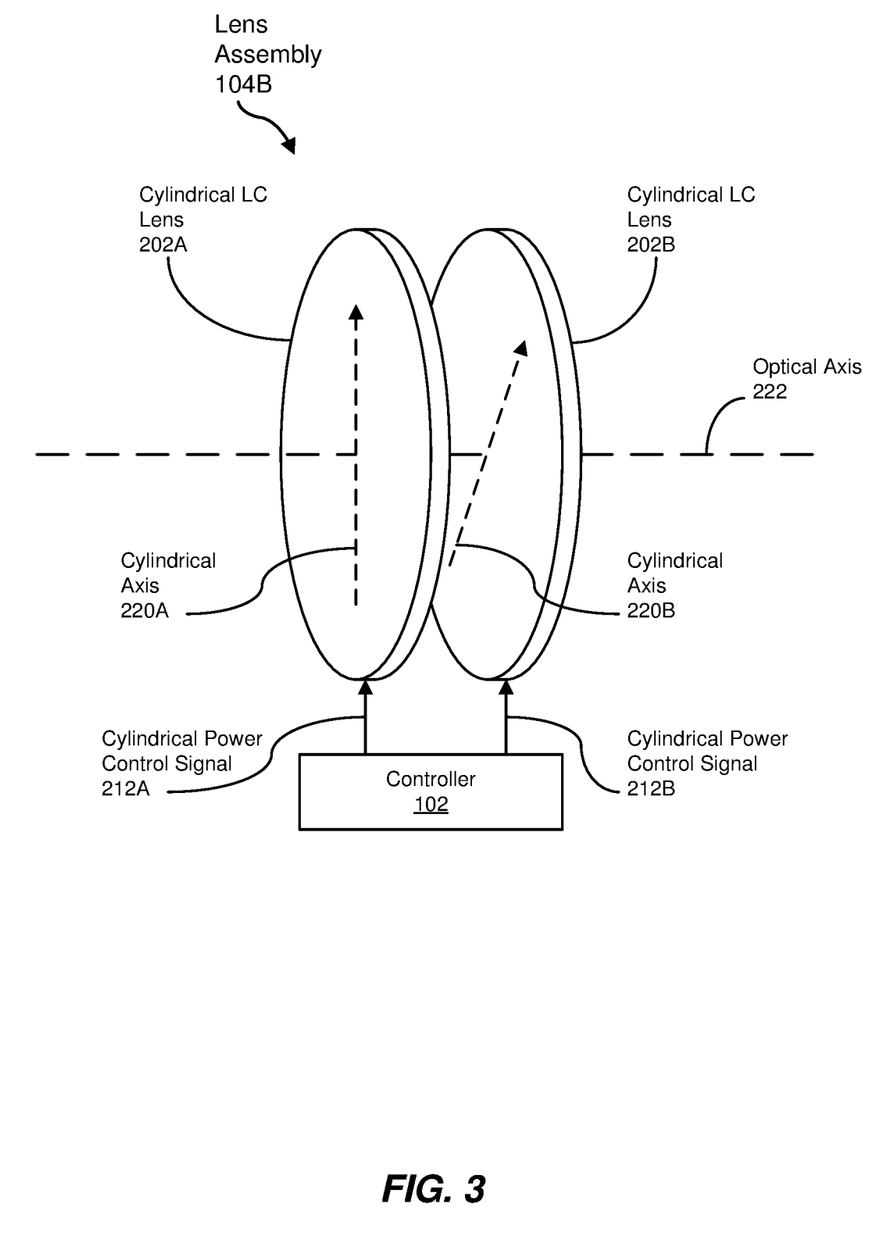
FIG. 3 is a perspective view of another exemplary lens assembly employable in the exemplary system of FIG. 1.
Figure 4:
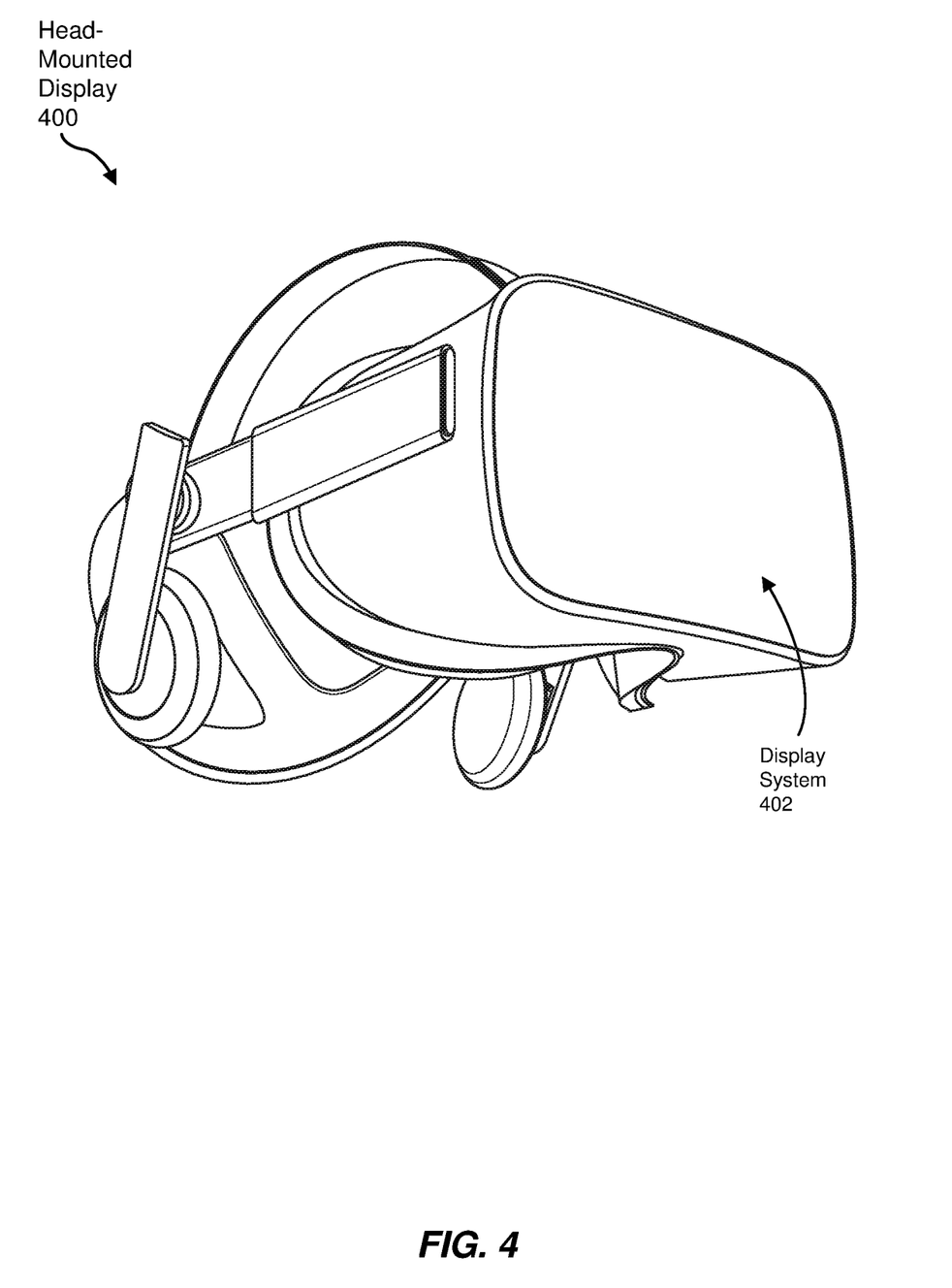
FIG. 4 is a perspective view of an exemplary HMD in which an exemplary display system for providing astigmatic correction may be employed.

The following will provide, with reference to FIGS. 1-7, detailed descriptions of systems and methods for astigmatic correction in HMDs and similar viewing systems. An exemplary system for astigmatic correction that includes a controller and an electrically controllable lens assembly is discussed in conjunction with FIG. 1. Two exemplary lens assemblies employable in the exemplary system of FIG. 1 are discussed in connection with FIGS. 2 and 3. An exemplary HMD is presented in reference to FIG. 4, and an exemplary system for astigmatic correction employable in the exemplary HMD of FIG. 4 is discussed in connection with FIGS. 5 and 6. In conjunction with FIG. 7, an exemplary method of astigmatic correction is discussed.

FIG. 1 is a block diagram of an exemplary system 100 for astigmatic correction that may be employed in various display systems, including, but not limited to, HMDs. System 100, in some embodiments, may include a controller 102 and a lens assembly 104. In at least some examples, lens assembly 104 may provide a cylindrical power and associated cylindrical axis that are electronically controllable. In some examples, the term "electronically controllable," as used herein, may refer to any electronic means by which a level of cylindrical power and/or an orientation of cylindrical axis provided by lens assembly 104 may be controlled (e.g., via digital values, electrical voltage, electrical current, or the like). In some embodiments described below, lens assembly may incorporate one or more liquid crystal lenses (LCLs). However, other electronically controllable components that may provide a controllable cylindrical power and/or cylindrical axis may be employed in other embodiments.

Additionally, as employed herein, the terms "spherical power," "cylindrical power," and "cylindrical axis" may correspond to the "sphere," "cylinder," and "axis" components of a corrective lens, or eyeglass, prescription, as is typically specified for a contact lens or eyeglass lens for each eye of a user. In at least some examples, the sphere component specifies a spherical correction (e.g., for hyperopia (farsightedness), myopia (nearsightedness), presbyopia (focusing difficulty based on hardening of the human lens), and so on) in which the amount of correction is the same for light rays propagating in every direction perpendicular to the optical axis of the eye.

Generally, proper optical correction for people with astigmatism may require more than simple spherical correction due to the asymmetrical (e.g., non-spherical) shape of the cornea or lens of the eye associated with astigmatism, as spherical correction cannot address the differences in corrective power along different axes (sometimes called "meridians") perpendicular to the optical axis. Consequently, the cylinder and axis components of the typical eyeglass prescription are intended to provide a more comprehensive optical correction. In at least some examples, the cylinder component specifies a maximum negative or positive optical power offset relative to the sphere component of the prescription, while the axis component defines the axis of orientation of the greatest or least amount of power correction (e.g., as defined by the sphere and cylinder components) relative to some absolute orientation (e.g., horizontal). In some embodiments, the axis component may specify the orientation of the meridian aligned with the sphere component or the cylinder component, either of which may be associated with the least or greatest amount of correction being applied. In some examples, the meridians associated with the least and greatest amount of correction may be separated by 90 degrees.

Consequently, in at least some examples employed herein, lens assembly 104 may provide an electronically controllable cylindrical power that may correspond to the cylinder component of an eyeglass prescription, or some power component related thereto. Moreover, lens assembly 104 may provide an electronically controllable cylindrical axis that may correspond to the axis component of an eyeglass prescription, or some other orientation offset from the axis component (e.g., by 90 degrees).

Moreover, in some examples discussed below, the astigmatic correction provided in the various systems and methods presented herein may be combined with spherical correction such that a complete eyeglass prescription, as represented by the sphere, cylinder, and axis components, may be facilitated for an eye of a viewer. Further, in some embodiments, a system and/or method may operate to apply a separate eyeglass prescription for each eye of the viewer.

FIG. 2 is a perspective view of an exemplary lens assembly 104A employable in system 100 of FIG. 1. Lens assembly 104A, in some examples, may include a cylindrical liquid crystal lens (LCL) 202 coupled to a rotational actuator 204. In some embodiments, an LCL, as used herein, may be a substantially transparent structure (e.g., a substantially planar structure including glass or a polymer) that may include liquid crystals that align in response to an electronic stimulus (e.g., an electric field) to provide a controllable refractive index for the structure. Moreover, cylindrical LCL 202 may provide a controllable refractive index that provides refractive power of some maximum value along a first meridian while maintaining substantially zero power along a second meridian perpendicular to the first meridian. In the example of FIG. 2, a cylindrical axis 220 of cylindrical LCL 202 may be defined as being aligned with the first meridian in some embodiments, or may be defined as being aligned with the second meridian in other embodiments. In some examples, the amount of refraction is electronically controllable by way of a cylindrical power control signal 212 generated by controller 102. Moreover, in some embodiments, the resulting cylindrical power of cylindrical LCL 202 (as well as other cylindrical LCLs described herein) may be zero, positive, or negative. As indicated in the example of FIG. 2, cylindrical LCL 202 may not present a physical cylindrical curvature and, in some examples, may exhibit more of a planar structure. Instead, the characterization of cylindrical LCL 202 refers to the light refraction provided as corresponding primarily to that of a cylindrical lens.

In at least some examples, the orientation of cylindrical axis 220 may be constant relative to cylindrical LCL 202 itself. Accordingly, cylindrical LCL 202 may be coupled to rotational actuator 204 such that cylindrical LCL 202 (and, consequently, cylindrical axis 220) may be rotated about an optical axis 222 of an optical system (e.g., an optical system of an HMD) associated with system 100. Further, rotational actuator 204 may rotate cylindrical LCL 202 in response to a cylindrical axis control signal 214 generated by controller 102. In the particular example of FIG. 2, rotational actuator 204 may include a central opening, the edge of which may be connected to one or more portions of a perimeter of cylindrical LCL 202 so that light (e.g., from a display device) may pass through cylindrical LCL 202 without obstruction by rotational actuator 204. However, other physical structures or configurations embodying rotational actuator 204 and its coupling to cylindrical LCL 202 are also possible. In some embodiments, any of various types of electronically controllable drives (e.g., stepper motor, voice coil actuator, or the like) of rotational actuator 204 may cause rotation of cylindrical LCL 202 about optical axis 222. Thus, by generating cylindrical power control signal 212 to control a cylindrical optical power by altering a cylindrical refractive index of cylindrical LCL 202 for an eye of a particular viewer, and by generating cylindrical axis control signal 214 for rotational actuator 204 to rotate cylindrical LCL 202 about optical axis 222 to align cylindrical axis 220 appropriately for the eye of the viewer, lens assembly 104A may provide astigmatic correction for the eye of the viewer.

Controller 102, in some embodiments, may include analog and/or digital hardware, one or more processors that execute software or firmware instructions, or some combination thereof to generate cylindrical power control signal 212 and cylindrical axis control signal 214 to provide astigmatic correction for an eye of a viewer. According to some embodiments, either or both of cylindrical power control signal 212 and cylindrical axis control signal 214, as well as other control signals described herein, may include one or more individual signals. Further, in some examples, controller 102 may drive control signals 212 and 214 by way of one or more open loop control systems. In other embodiments, system 100 may include one or more sensors (e.g., positional sensors, rotational sensors, and so forth) (not shown in FIG. 2 or 3) that provide positional and/or rotational information to controller 102 so that controller 102 may implement one or more closed loop control systems to generate control signals 212 and 214.

FIG. 3 is a perspective view of another exemplary lens assembly 104B employable in system 100 of FIG. 1. Lens assembly 104B, in some embodiments, may include a first cylindrical LCL 202A and a second cylindrical LCL 202B aligned along optical axis 222 of an optical system, such as an optical system of an HMD. As with cylindrical LCL 202 of FIG. 2, cylindrical LCLs 202A and 202B may each provide a controllable refractive index that provides refractive power of some maximum value along a first meridian while maintaining substantially zero power along a second meridian perpendicular to the first meridian. Further, in some embodiments, first cylindrical LCL 202A may define a first cylindrical axis 220A, while the second cylindrical LCL 202B may define a second cylindrical axis 220B, each of which may be defined as being aligned with the first meridian or second meridian of its corresponding cylindrical LCL 202A or 202B. Additionally, in at least some examples, first cylindrical axis 220A and second cylindrical axis 220B are not coaligned about optical axis 222. In some examples, first cylindrical axis 220A and second cylindrical axis 220B are rotationally offset from each other by some angle greater than zero degrees and less than 180 degrees. In some specific examples, first cylindrical axis 220A and second cylindrical axis 220B may be rotationally offset by 45 degrees or 90 degrees.

In some embodiments, the rotational offset between first cylindrical axis 220A and second cylindrical axis 220B may facilitate the generation of a particular cylindrical power at a specific cylindrical axis based on the cylindrical power and axis of the individual cylindrical LCLs 202A and 202B, as determined by respective first cylindrical power control signals 212A and 212B generated by controller 102. For example, controller 102 may cause first cylindrical LCL 202A to generate a first cylindrical power oriented along first cylindrical axis 220A by way of first cylindrical power control signal 212A, and may cause second cylindrical LCL 202B to generate a second cylindrical power oriented along second cylindrical axis 220B by way of second cylindrical power control signal 212B, to generate an overall desired cylindrical power oriented along a desired cylindrical axis via a combination of the first and second cylindrical powers. In some examples, the combination of the first and second cylindrical powers is a vector addition of the first and second cylindrical powers.

FIG. 4 is a perspective view of an exemplary head-mounted display (HMD) 400 that may present images to the eyes of a viewer as part of a VR, AR, or MR system. To present these images, HMD 400, in some embodiments, may include at least one display system 402 that provides astigmatic (and possibly spherical) optical correction for an eye of a viewer. In some embodiments, two display systems 402, one per user eye, may be incorporated in HMD 400.

Figure 5:
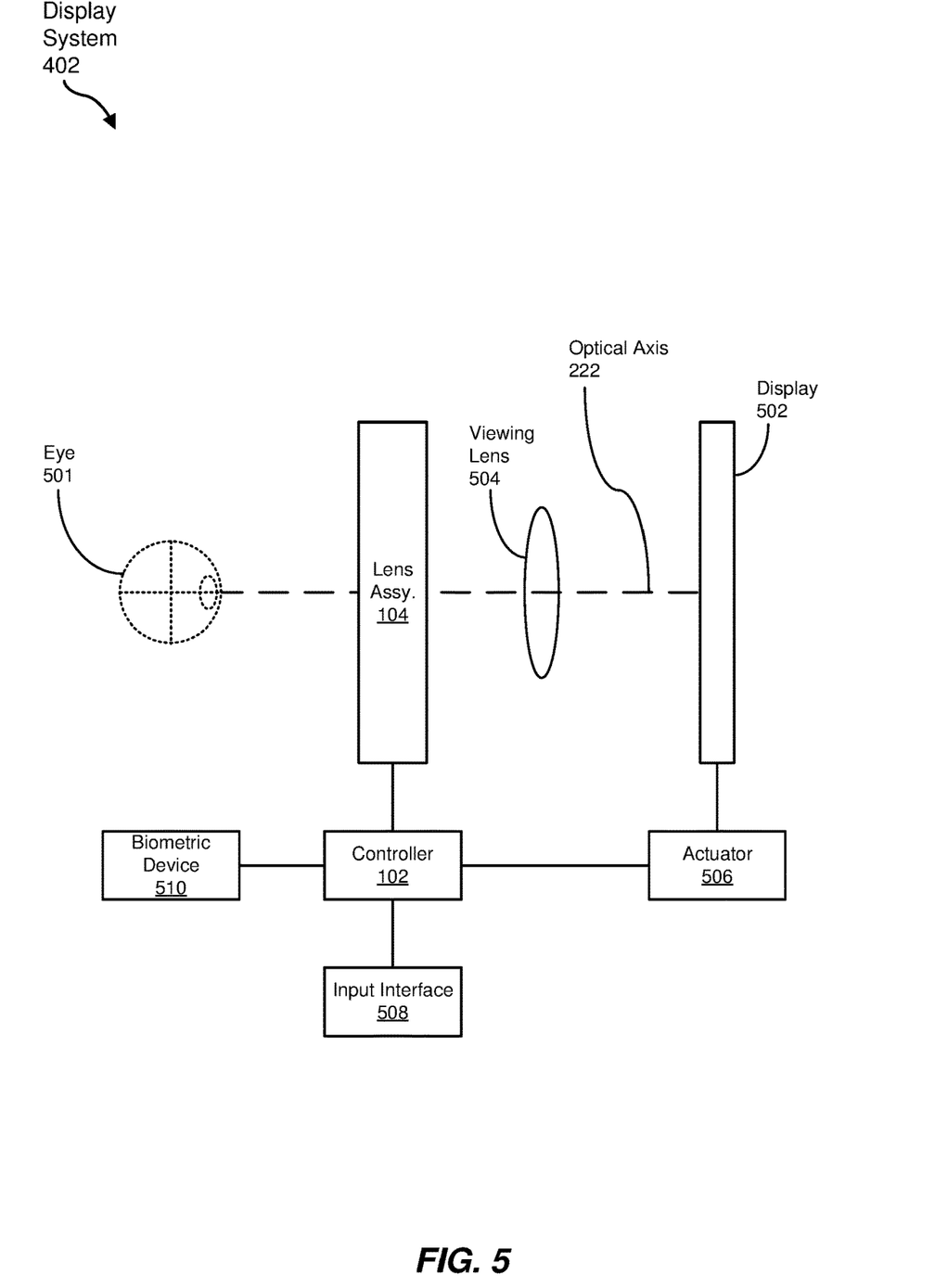
FIG. 5 is a side view of an exemplary display system for astigmatic correction employable in an HMD, such as the exemplary HMD of FIG. 4.

FIG. 5 is a side view of an exemplary display system 402 that may be employed within an HMD (e.g., HMD 400 of FIG. 4). As shown, display system 402 may include a display 502 (e.g., a liquid crystal display (LCD), a liquid crystal on silicon (LCoS) display, an organic light-emitting diode (OLED) display, and so on) located on optical axis 222 with an eye 501 of a viewer. In some examples in which two display systems 402 are incorporated in a single HMD 400, a single shared display 502 may be used for both display systems 402.

Also located on optical axis 222, between display 502 and eye 501, may be lens assembly 104 (e.g., lens assembly 104A or 104B of FIGS. 2 and 3) communicatively coupled with controller 102. In addition, in at least some embodiments, a viewing lens 504 may be positioned along optical axis 222 between display 502 and eye 501 (e.g., between lens assembly 104 and display 502) to focus light received from display 502 into eye 501. In some examples, use of viewing lens 504 may cause images provided by display 502 to occupy a greater amount of the field of view (FOV) of eye 501 to provide a more realistic VR, AR, or MR experience.

Additionally, display system 402 may include an actuator 506 communicatively coupled with controller 102 and mechanically coupled with at least one optical component along optical axis 222. In the particular example of FIG. 5, actuator 506 is mechanically coupled with display 502 to move display 502 along optical axis 222 closer to and/or farther from viewing lens 504. In other embodiments, one or more actuators 506 may be mechanically coupled with display 502, lens assembly 104, and/or viewing lens 504 to move one or more of these components along optical axis 222. While the example of display system 402 shown in FIG. 5 depicts a linear optical axis 222, other embodiments may more generally employ an optical path that includes a linear optical axis 222, or that follows a non-linear optical path by way of one or more mirrors, lenses, and/or other optical components.

Movement of display 502 and/or other optical components along optical axis 222, in some examples, may provide a more three-dimensional experience for the viewer by causing eye 501 to refocus on light from display 502 in response to a movement of display 502 and/or other components along optical axis 222. Additionally or alternatively, such movement may facilitate spherical (e.g., symmetrical) optical correction for eye 501. Consequently, in such examples, controller 102 may employ lens assembly 104 (e.g., as described above in reference to FIGS. 1-3) in conjunction with movement of display 502 and/or other optical components along optical axis 222 using actuator 506 to provide substantially complete (e.g., spherical and cylindrical) optical correction for eye 501.

In some embodiments, display system 402 may include an input interface 508 and/or a biometric device 510, each or both of which may be used to receive or determine the eyeglass prescription (e.g., the sphere, cylinder, and axis components) for eye 501. In some examples, the viewer may employ input interface 508 to manually enter the eyeglass prescription for each eye 501. In some embodiments, input interface 508 may be incorporated within HMD 400, and may include one or more buttons and/or other input components. In other examples, input interface 508 may be provided by another electronic device (e.g., computer, smartphone, of the like) communicatively coupled with HMD 400.

In some embodiments, the viewer may employ input interface 508 to select potential values for each component of the eyeglass prescription presented to the viewer via display 502. In other examples, the viewer may use input interface 508 to manipulate one or more of the prescription components while viewing test patterns or other images on display 502 to render the patterns or images focused from the viewer's perspective while controller 102 controls lens assembly 104 and/or actuator 506. Once the patterns or images appear to be focused, the viewer may then indicate that fact to controller 102 via input interface 508 so that controller 102 may store (e.g., in a memory communicatively coupled to controller 102) corresponding values associated with the eyeglass prescription (e.g., the eyeglass prescription components, values for control signals provided to lens assembly 104 and/or actuator 506, etc.) in conjunction with identifying information for the viewer so that controller 102 may provide the appropriate optical correction for eye 501 of the viewer during subsequent uses of display system 402 by the viewer.

In some embodiments, biometric device 510 may detect a biological characteristic of the viewer. Examples of the biological characteristic detected may include, but are not limited to, a fingerprint, an iris, or a retina of the viewer. Consequently, biometric device 510 may be, for example, an image scanner capable of detecting the desired biological characteristic. Based on the biological characteristic, controller 102 may determine an identity of the viewer based on the biological characteristic. For example, the viewer may have previously entered identifying information (e.g., viewer name, viewer identifier, or the like) via input interface 508 when the viewer originally set up the display system 402 to provide the appropriate optical correction (e.g., as discussed above). Moreover, controller 102 may store the biological characteristic of the viewer with the identifying information. For a subsequent use of display system 402 by the viewer, controller 102 may employ biometric device 510 to detect the biological characteristic of the viewer, determine the viewer identity by way of the detected biological characteristic, retrieve the previously stored information associated with the eyeglass prescription of the identified viewer, and employ that information to control lens assembly 104 and/or actuator 506 to provide appropriate optical correction for eyes 501 of the viewer.

In some embodiments, the biological characteristic detected by biometric device 510 may indicate the eyeglass prescription for eyes 501 of the viewer. For example, biometric device 510 may include an optical wavefront sensor that detects one or more optical characteristics of eyes 501, such as the shape of the corneas and/or lenses of eyes 501. Based on the detected biological characteristics, controller 102 may generate the eyeglass prescription or related information for eyes 501 of the viewer and generated control signals for lens assembly 104 and/or actuator 506 to apply the proper optical correction for eyes 501 of the viewer. Controller 102 may also, in some examples, store the prescription-related information in conjunction with an identifier for the viewer so that lens assembly 104 and/or actuator 506 may be controlled or configured properly the next time the viewer uses display system 402, as explained above.

Figure 6:
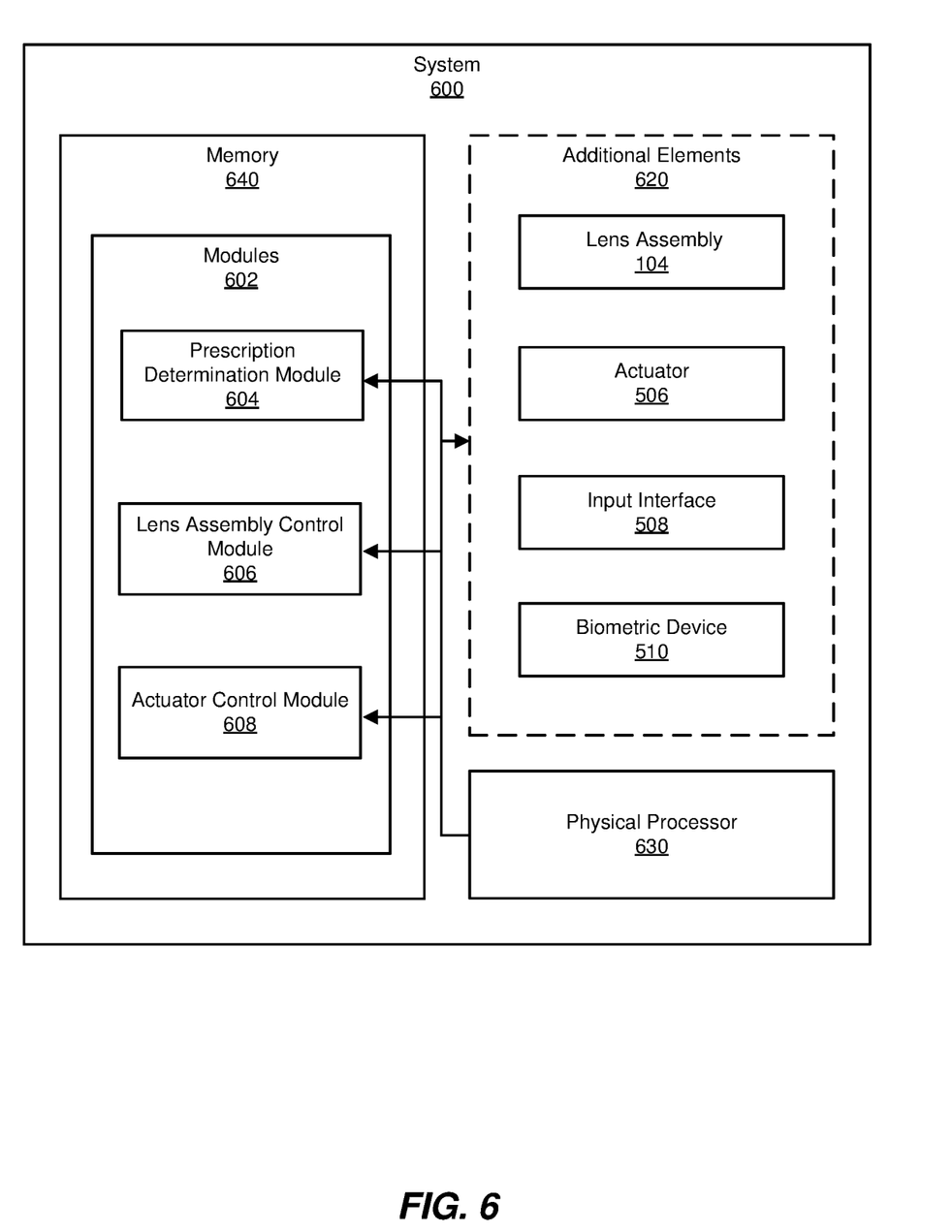
FIG. 6 is a block diagram of an exemplary system that may include the exemplary system of FIG. 5.

FIG. 6 is a block diagram of an exemplary system 600 including lens assembly 104 (e.g., lens assembly 104A or 104B of FIGS. 2 and 3), as discussed above. As illustrated in FIG. 6, exemplary system 600 may include one or more modules 602 for performing one or more tasks. As will be explained in greater detail below, modules 602 may include a prescription determination module 604, a lens assembly control module 606, and an actuator control module 608. Although illustrated as separate elements, one or more of modules 602 in FIG. 6 may represent portions of a single module or application.

In the example embodiments described in greater detail below, system 600 may be employed as at least a portion of a display system (e.g., display system 402 of FIGS. 4 and 5) for providing astigmatic correction (and, in some implementations, spherical correction) for users of an HMD (e.g., HMD 400 of FIG. 4) or other display device. Such a system may include additional elements 620, such as lens assembly 104 (e.g., lens assembly 104A or 104B of FIGS. 2 and 3), actuator 506, input interface 508, and biometric device 510. Additionally, one or more modules 602 and/or additional elements 620 (e.g., input interface 508), or portions thereof, may reside outside HMD 400 or other display device.

Prescription determination module 604, in some embodiments, may receive viewer identification information (e.g., from input interface 508) and/or other information (e.g., biological characteristics from biometric device 510) possibly used to identify one or more viewers, as discussed above. Additionally, prescription determination module 604 may receive biological characteristics (e.g., from biometric device 510) indicative of eyeglass prescription information for the viewers. Based on such information, prescription determination module 604 may store information indicative of an eyeglass prescription (e.g., the eyeglass prescription itself, control information for lens assembly 104 and/or actuator 506, or the like) for each viewer.

Lens assembly control module 606, in some examples, may generate one or more control signals (e.g., cylindrical power control signal 212 and cylindrical axis control signal 214 of FIG. 2, cylindrical power control signals 212A and 212B of FIG. 3, or the like) to control lens assembly 104, as discussed earlier. Similarly, in some embodiments, actuator control module 608 may generate one or more control signals to control actuator 506, as explained more fully above. Further, in some examples, lens assembly control module 606 and actuator control module 608 may base the generated control signals on the information (e.g., eyeglass prescription information, control information, etc.) generated and/or stored by prescription determination module 604, as discussed in detail above.

In certain embodiments, one or more of modules 602 in FIG. 6 may represent one or more software applications or programs that, when executed by a computing device, may cause the computing device to perform one or more tasks. One or more of modules 602 in FIG. 6 may also represent all or portions of one or more special-purpose computers configured to perform one or more tasks.

As illustrated in FIG. 6, system 600 may also include one or more memory devices, such as memory 640. Memory 640 generally represents any type or form of volatile or non-volatile storage device or medium capable of storing data and/or computer-readable instructions. In one example, memory 640 may store, load, and/or maintain one or more of modules 602. As illustrated in FIG. 6, system 600 may also include one or more physical processors, such as physical processor 630, that may access and/or modify one or more of modules 602 stored in memory 640, thus operating as controller 102 of FIGS. 1-3 and 6. Additionally or alternatively, physical processor 630 may execute one or more of modules 602. In yet other example embodiments, one or more of modules 602, or portions thereof, instead may be implemented as hardware components not stored in memory 640, such as electronic circuitry for performing one or more tasks described above. Additionally, in some examples, memory 640 may include information generated and/or employed by modules 602 (e.g., viewer identifiers, information describing detected biological characteristics for the viewers, eyeglass prescriptions of the viewers, control information for lens assembly 104 and/or actuator 506, and so on), as described above.

In other examples, some functionality described above as performed by physical processor 630 executing modules 602 may instead be performed by special-purpose circuitry included in system 600.

Figure 7:
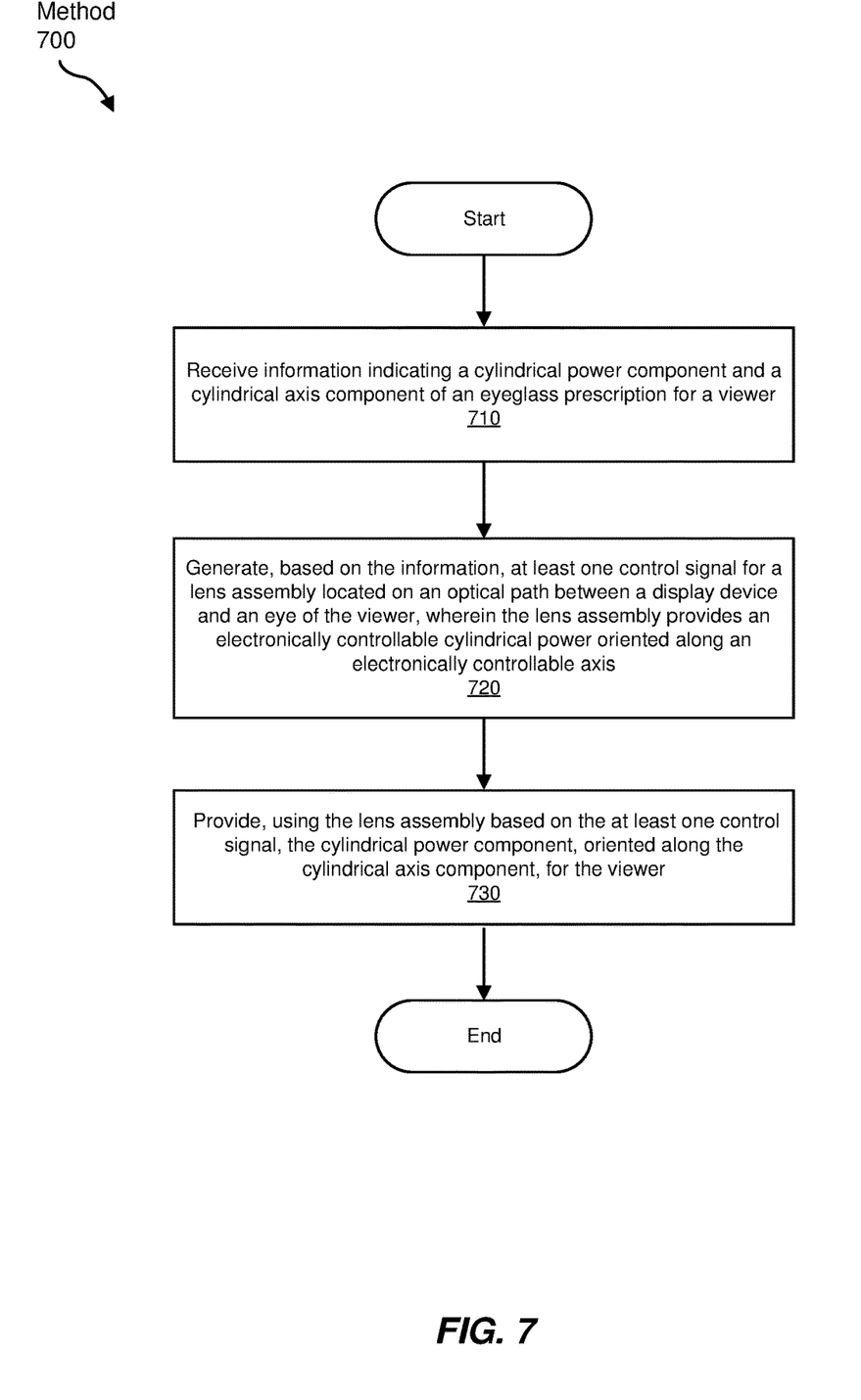
FIG. 7 is a flow diagram of an exemplary method of astigmatic correction.

FIG. 7 is a flow diagram of an exemplary method 700 for astigmatism correction. The steps shown in FIG. 7 may be performed by any suitable computer-executable code and/or computing system, including the system(s) illustrated in FIGS. 1-6. In one example, each of the steps shown in FIG. 7 may represent an algorithm whose structure includes and/or is represented by multiple sub-steps, examples of which are described above in greater detail.

As illustrated in FIG. 1, at step 710, information may be received (e.g., by prescription determination module 604) indicating a cylindrical power component and a cylindrical axis component of an eyeglass prescription for a viewer. The information received may be the actual components of the eyeglass prescription or other information (e.g., biological characteristic information) indicative of the cylindrical power component and the cylindrical axis component. At step 720, based on the information, at least one control signal for a lens assembly (e.g., lens assembly 104) located on an optical path between a display device (e.g., display 502) and an eye of the viewer is generated (e.g., by lens assembly control module 606). In at least some examples, the lens assembly may provide an electronically controllable cylindrical power oriented along an electronically controllable axis, as discussed above. At step 730, using the lens assembly based on the at least one control signal, the cylindrical power component, oriented along the cylindrical axis component, is provided for the viewer.

As explained above in conjunction with FIGS. 1 through 7, the lens assemblies described herein, as well as the systems and methods employing such assemblies, may facilitate astigmatic correction (and possibly spherical correction) of a viewer using an HMD or other display system, thus potentially eliminating the need for the viewer to don eyeglasses while using the display system, which may be difficult given possible space constraints between the eyes of the viewer and components of the display system. Additionally, use of prescription eyeglasses may compromise one or more functions of the display system, such as the focusing of light from the display onto the eyes of the viewer, and the tracking of eye movements to enhance display system functionality. Thus, in some examples, use of the disclosed systems and method may enhance both display functionality and user comfort.

EXAMPLE EMBODIMENTS

Example 1: A method may include (1) providing, from a display device, an image to an eye of a viewer by way of a lens assembly that provides an electronically controllable cylindrical power, oriented along an electronically controllable axis, on an optical path between the display device and the eye of the viewer, where the lens assembly includes (a) a first liquid crystal lens providing a first electronically controllable cylindrical power, oriented along a first constant axis, in response to a first control signal and (b) a second liquid crystal lens providing a second electronically controllable cylindrical power, oriented along a second constant axis that is rotationally offset from the first constant axis, in response to a second control signal, (2) determining, by a controller based on information indicating a cylindrical power component and a cylindrical axis component for the viewer, the first and second electronically controllable cylindrical powers that result in providing the cylindrical power component, oriented along the cylindrical axis component, for the viewer, and (3) generating, by the controller based on the first and second electronically controllable cylindrical powers, the first and second control signals to cause the lens assembly to provide the cylindrical power component, oriented along the cylindrical axis component, for the viewer without physical rotation of either the first liquid crystal lens or the second liquid crystal lens.

Example 2: The method of Example 1, where a rotational offset between the first constant axis and the second constant axis may range from greater than zero degrees to less than 180 degrees.

Example 3: The method of Example 2, where the rotational offset between the first constant axis and the second constant axis may be approximately 45 degrees.

Example 4: The method of Example 2, where the rotational offset between the first constant axis and the second constant axis may be approximately 90 degrees.

Example 5: The method of any one of Examples 1-4, where the method may further include (1) generating, based on further information indicating a spherical power component for the viewer, at least one second control signal to compensate for the spherical power component for the viewer and (2) altering, by an actuator, a distance between the display device and the eye of the viewer based on the at least one second control signal.

Example 6: The method of any one of Examples 1-4, where the method may further include (1) generating, based on further information indicating a spherical power component for the viewer, at least one second control signal to compensate for the spherical power component for the viewer and (2) altering, by an actuator, a distance between a viewing lens and the display device based on the at least one second control signal, where the viewing lens is located on the optical path between the display device and the eye of the viewer.

Example 7: The method of Example 6, where the spherical power component may correspond to a sphere component of a corrective lens prescription for the viewer.

Example 8: The method of any one of Examples 1-4, where the method may further include receiving, at a manual input interface, the information indicating the cylindrical power component and the cylindrical axis component.

Example 9: The method of Example 8, where the method may further include (1) storing, in a memory, the information indicating the cylindrical power component and the cylindrical axis component, (2) detecting, using a biometric device, a biological characteristic of the viewer, (3) determining, by the controller, an identity of the viewer based on the biological characteristic, and (4) retrieving, by the controller, the information indicating the cylindrical power component and the cylindrical axis component from the memory based on the identity of the viewer.

Example 10: The method of Example 9, where the biological characteristic may include a characteristic of a fingerprint of the viewer.

Example 11: The method of Example 9, where the biological characteristic may include a characteristic of an iris of the viewer.

Example 12: The method of Example 9, where the biological characteristic may include a characteristic of a retina of the viewer.

Example 13: The method of any one of Examples 1-4, where the method may further include (1) displaying, by the display device, test images and (2) receiving, by a manual input interface, at least one first command from the viewer to alter an appearance of the test images and (3) where generating the first and second control signals is based on the at least one first command.

Example 14: The method of Example 13, where the method may further include (1) receiving, by the manual input interface, a second command from the viewer indicating a focused state for the test images and (2) storing, in a memory by the controller in response to the second command, the information indicating the cylindrical power component and the cylindrical axis component for the viewer.

Example 15: The method of any one of Examples 1-4, where the method may further include (1) detecting, by a biometric device, a biological characteristic of the viewer and (2) generating, by the controller based on the biological characteristic, the information indicating the cylindrical power component and the cylindrical axis component for the viewer.

Example 16: The method of Example 15, where the biometric device may include an optical wavefront sensor.

Example 17: The method of any one of Examples 1-4, where the cylindrical power component may correspond to a cylinder component of a corrective lens prescription for the viewer.

Example 18: The method of any one of Examples 1-4, where the cylindrical axis component may correspond to an axis component of a corrective lens prescription for the viewer.

Example 19: A non-transitory computer-readable medium including computer-readable instructions that, when executed by at least one processor of a computing device, may cause the computing device to (1) provide, from a display device, an image to an eye of a viewer by way of a lens assembly that provides an electronically controllable cylindrical power, oriented along an electronically controllable axis, on an optical path between the display device and the eye of the viewer, where the lens assembly includes (a) a first liquid crystal lens providing a first electronically controllable cylindrical power, oriented along a first constant axis, in response to a first control signal and (b) a second liquid crystal lens providing a second electronically controllable cylindrical power, oriented along a second constant axis that is rotationally offset from the first constant axis, in response to a second control signal, (2) determine, by a controller based on information indicating a cylindrical power component and a cylindrical axis component for the viewer, the first and second electronically controllable cylindrical powers that result in providing the cylindrical power component, oriented along the cylindrical axis component, for the viewer, and (3) generate, by the controller based on the first and second electronically controllable cylindrical powers, the first and second control signals to cause the lens assembly to provide the cylindrical power component, oriented along the cylindrical axis component, for the viewer without physical rotation of either the first liquid crystal lens or the second liquid crystal lens.

Example 20: The non-transitory computer-readable medium of Example 19, where the computer-readable instructions may further cause the computing device to (1) generate, based on further information indicating a spherical power component for the viewer, at least one second control signal to compensate for the spherical power component for the viewer and (2) alter, by an actuator, a distance between at least one of the lens assembly or the display device and the eye of the viewer based on the at least one second control signal.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive biological characteristic data (e.g., scanning data, optical correction data, etc.) of a viewer to be transformed, and transform the received data into control signals for a lens assembly to provide astigmatism correction. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Embodiments of the instant disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
   providing, from a display device, an image to an eye of a viewer by way of a lens assembly that provides an electronically controllable cylindrical power, oriented along an electronically controllable axis, on an optical path between the display device and the eye of the viewer, wherein the lens assembly comprises:
   a first liquid crystal lens providing a first electronically controllable cylindrical power, oriented along a first constant axis, in response to a first control signal; and
   a second liquid crystal lens providing a second electronically controllable cylindrical power, oriented along a second constant axis that is rotationally offset from the first constant axis, in response to a second control signal;
   determining, by a controller based on information indicating a cylindrical power component and a cylindrical axis component for the viewer, the first and second electronically controllable cylindrical powers that result in providing the cylindrical power component, oriented along the cylindrical axis component, for the viewer; and
   generating, by the controller based on the first and second electronically controllable cylindrical powers, the first and second control signals to cause the lens assembly to provide the cylindrical power component, oriented along the cylindrical axis component, for the viewer without physical rotation of either the first liquid crystal lens or the second liquid crystal lens.

2. The method of claim 1, wherein a rotational offset between the first constant axis and the second constant axis ranges from greater than zero degrees to less than 180 degrees.

3. The method of claim 2, wherein the rotational offset between the first constant axis and the second constant axis is approximately 45 degrees.

4. The method of claim 2, wherein the rotational offset between the first constant axis and the second constant axis is approximately 90 degrees.

5. The method of claim 1, further comprising:
   generating, based on further information indicating a spherical power component for the viewer, at least one second control signal to compensate for the spherical power component for the viewer; and
   altering, by an actuator, a distance between the display device and the eye of the viewer based on the at least one second control signal.

6. The method of claim 1, further comprising:
   generating, based on further information indicating a spherical power component for the viewer, at least one second control signal to compensate for the spherical power component for the viewer; and
   altering, by an actuator, a distance between a viewing lens and the display device based on the at least one second control signal, wherein the viewing lens is located on the optical path between the display device and the eye of the viewer.

7. The method of claim 6, wherein the spherical power component corresponds to a sphere component of a corrective lens prescription for the viewer.

8. The method of claim 1, further comprising:
   receiving, at a manual input interface, the information indicating the cylindrical power component and the cylindrical axis component.

9. The method of claim 8, further comprising:
   storing, in a memory, the information indicating the cylindrical power component and the cylindrical axis component;
   detecting, using a biometric device, a biological characteristic of the viewer;
   determining, by the controller, an identity of the viewer based on the biological characteristic; and
   retrieving, by the controller, the information indicating the cylindrical power component and the cylindrical axis component from the memory based on the identity of the viewer.

10. The method of claim 9, wherein the biological characteristic comprises a characteristic of a fingerprint of the viewer.

11. The method of claim 9, wherein the biological characteristic comprises a characteristic of an iris of the viewer.

12. The method of claim 9, wherein the biological characteristic comprises a characteristic of a retina of the viewer.

13. The method of claim 1, further comprising:
    displaying, by the display device, test images; and
    receiving, by a manual input interface, at least one first command from the viewer to alter an appearance of the test images; and
    wherein generating the first and second control signals is based on the at least one first command.

14. The method of claim 13, further comprising:
    receiving, by the manual input interface, a second command from the viewer indicating a focused state for the test images; and
    storing, in a memory by the controller in response to the second command, the information indicating the cylindrical power component and the cylindrical axis component for the viewer.

15. The method of claim 1, further comprising:
    detecting, by a biometric device, a biological characteristic of the viewer; and
    generating, by the controller based on the biological characteristic, the information indicating the cylindrical power component and the cylindrical axis component for the viewer.

16. The method of claim 15, wherein the biometric device comprises an optical wavefront sensor.

17. The method of claim 1, wherein the cylindrical power component corresponds to a cylinder component of a corrective lens prescription for the viewer.

18. The method of claim 1, wherein the cylindrical axis component corresponds to an axis component of a corrective lens prescription for the viewer.

19. A non-transitory computer-readable medium comprising:
computer-readable instructions that, when executed by at least one processor of a computing device, cause the computing device to:
provide, from a display device, an image to an eye of a viewer by way of a lens assembly that provides an electronically controllable cylindrical power, oriented along an electronically controllable axis, on an optical path between the display device and the eye of the viewer, wherein the lens assembly comprises:
a first liquid crystal lens providing a first electronically controllable cylindrical power, oriented along a first constant axis, in response to a first control signal; and
a second liquid crystal lens providing a second electronically controllable cylindrical power, oriented along a second constant axis that is rotationally offset from the first constant axis, in response to a second control signal;
determine, by a controller based on information indicating a cylindrical power component and a cylindrical axis component for the viewer, the first and second electronically controllable cylindrical powers that result in providing the cylindrical power component, oriented along the cylindrical axis component, for the viewer; and
generate, by the controller based on the first and second electronically controllable cylindrical powers, the first and second control signals to cause the lens assembly to provide the cylindrical power component, oriented along the cylindrical axis component, for the viewer without physical rotation of either the first liquid crystal lens or the second liquid crystal lens.

20. The non-transitory computer-readable medium of claim 19, wherein the computer-readable instructions further cause the computing device to:
generate, based on further information indicating a spherical power component for the viewer, at least one second control signal to compensate for the spherical power component for the viewer; and
alter, by an actuator, a distance between at least one of the lens assembly or the display device and the eye of the viewer based on the at least one second control signal.

* * * * *